Aug. 20, 1946.  E. MILLER  2,406,093
TIRE BUILDING APPARATUS
Filed Sept. 22, 1944  3 Sheets-Sheet 2

INVENTOR.
EDWIN MILLER.
BY Archworth Martin
his ATTORNEY.

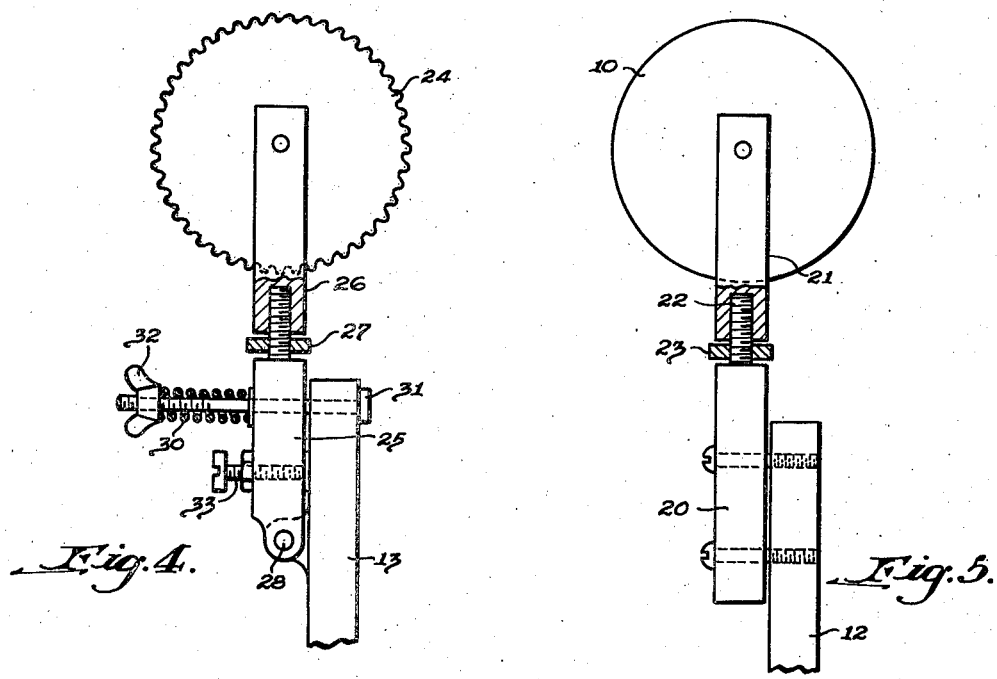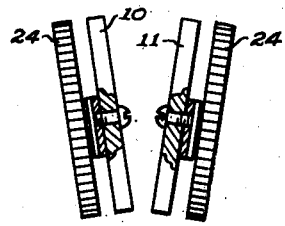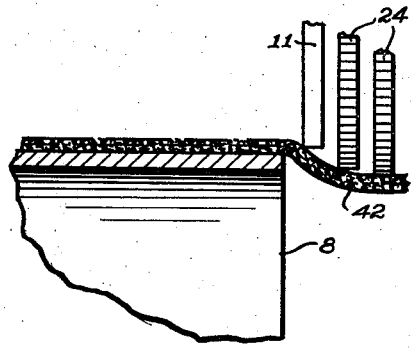

Patented Aug. 20, 1946

2,406,093

UNITED STATES PATENT OFFICE 2,406,093

TIRE BUILDING APPARATUS

Edwin Miller, Jeannette, Pa.

Application September 22, 1944, Serial No. 555,264

7 Claims. (Cl. 154—10)

My invention more especially relates to apparatus for stitching or rolling down the fabric plies of rubber tires, upon a tire building drum.

One object of the invention is to provide means supplemental to the usual tacker discs or wheels, for effecting preliminary adhesion of the fabric plies, so that there will be less danger of wrinkling of the plies by the stitching discs or wheels.

Another object of my invention is to provide means whereby the fabric plies or layers that extend beyond the ends of the drum are caused to adhere to one another and to be shaped in such manner as to facilitate the placing of the bead cores.

Still another object of my invention is to provide means whereby stitching discs or tacker discs may be so adjusted that they will more effectively produce a wiping or smoothing action during their travel toward the ends of the drum, so as to prevent wrinkles being formed in the fabric during stitching operation.

Figure 1:
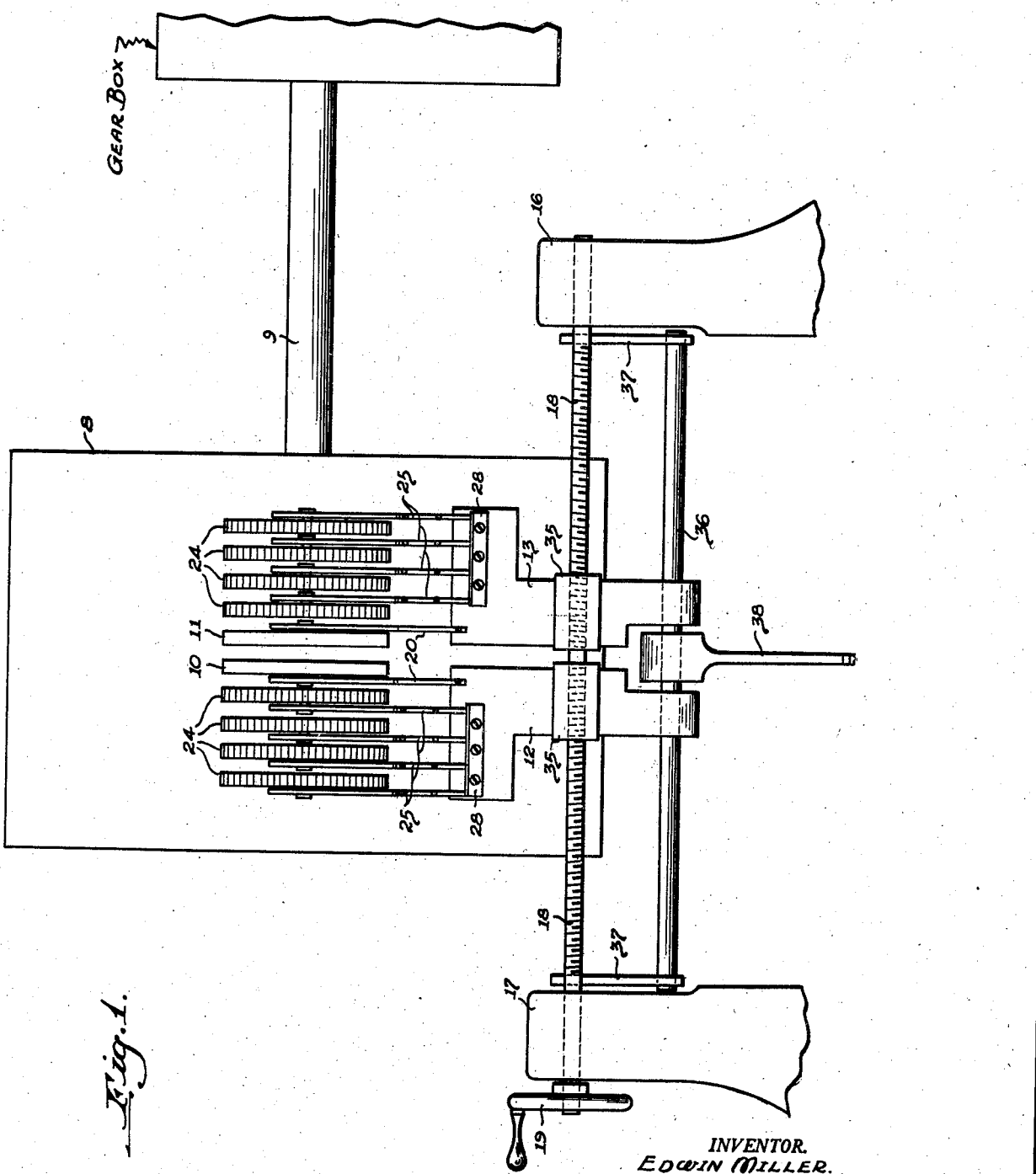
Figure 2:
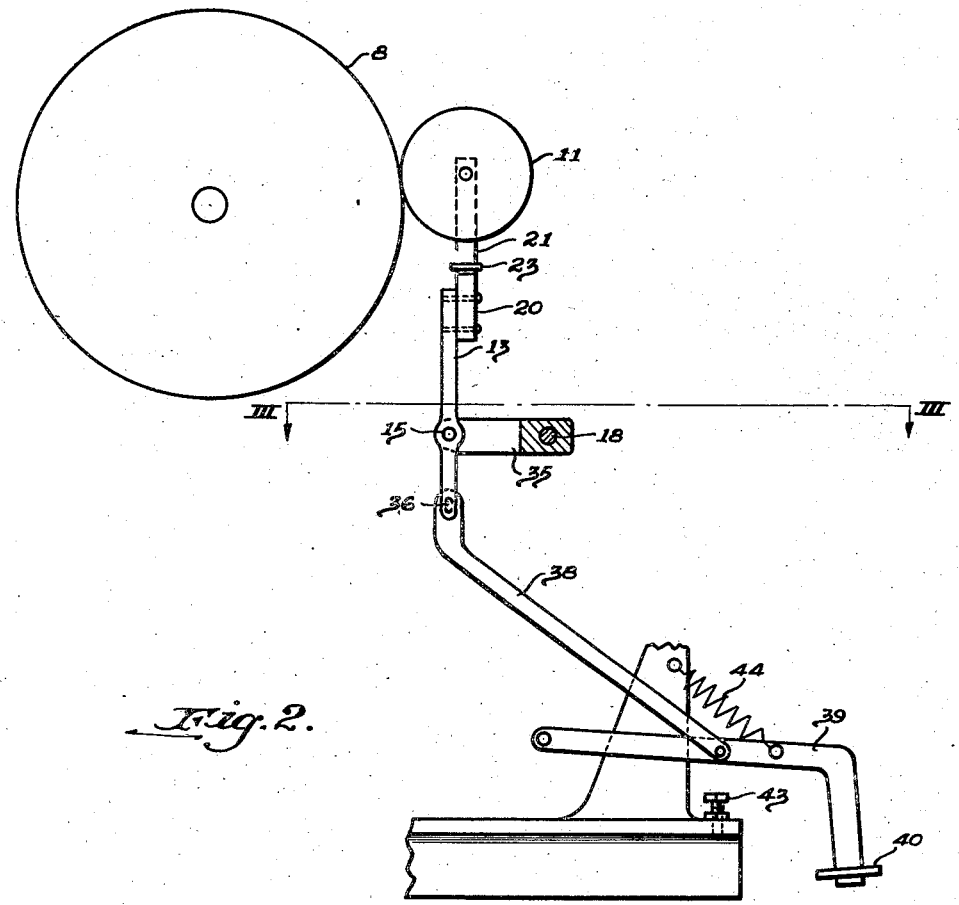
Figure 3:
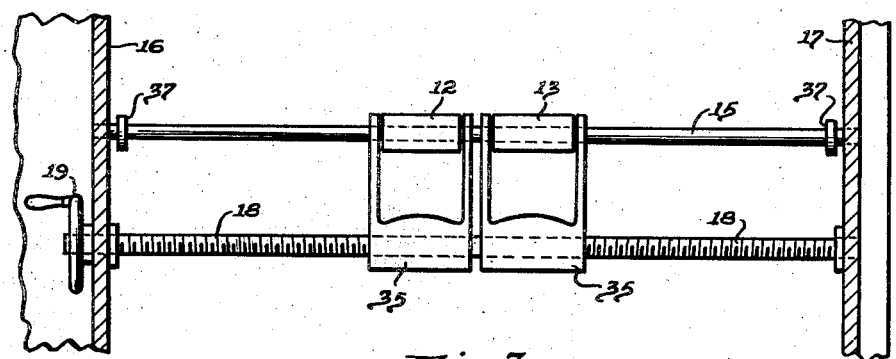

In the accompanying drawings, Figure 1 is a face view of the apparatus; Fig. 2 is a fragmentary end view thereof; Fig. 3 is a horizontal view of a portion of the apparatus taken on the line III—III of Fig. 2; Fig. 4 is an enlarged view, partly in section, showing details of means for adjusting the tacker discs; Fig. 5 is a similar view showing the manner in which the stitchers may be adjusted; Fig. 6 is an enlarged fragmentary view showing certain of the tacker discs of the stitcher discs in angularly adjusted positions, and Fig. 7 is a fragmentary view showing the manner in which the fabric plies are bent radially inward at the ends of the drum, for receiving a bead core.

My invention may be applied to various forms of mechanism other than that shown in the drawings and in conjunction with stitchers of various well known forms which are shifted in opposite directions axially, from the middle of the drum face to the ends thereof, a single pair of stitcher discs or wheels being commonly employed.

A conventional tire form drum 8 is driven by a shaft 9. The numerals 10 and 11 indicate stitchers that may be of any well known form, although they are here shown in Figs. 5 and 6 as being angularly adjustable. These discs are carried by brackets 12 and 13 slidably supported on a rod 15 (Fig. 2) whose ends are supported in frame members 16 and 17, the brackets being simultaneously slid in opposite directions across the face of the drum by a screw 18 journaled in the frame members 16 and 17, and turned by a hand wheel 19 or other suitable source of power, as explained more in detail hereafter. The stitchers 10—11 are respectively connected to the brackets 12 and 13, by arms 20 (Fig. 5) having extensions 21 on which the stitchers are journaled and which are angularly adjustable on screw-threaded studs 22, jam nuts 23 being provided to hold the extensions 21 in their adjusted positions. The stitchers may be set either in planes perpendicular to the axis of the tire-forming drum 8 or angularly as shown in Fig. 6.

Two sets of tacker wheels or discs 24 are carried by arms 25 and their extensions 26 that are screw-threaded on the arms and held in angular positions of adjustment by jam nuts 27, whereby the discs can be adjusted angularly as indicated in Fig. 6. The arms 25 are hingedly connected at 28 to the brackets 12 and 13 and are yieldably held in parallelism therewith by springs 30, screw studs 31, and wing nuts 32, the wing nuts being adjustable on the studs to vary the yieldable resistance to movement of the arms 25 on their hinges. The edges or peripheral surfaces of the discs 24 are toothed or serrated, to reduce danger of wrinkling of the fabric during the tacking and stitching thereof into place on the drum, since there will not be as much "crowding" of the fabric layers as would be the case with smooth-faced tacker wheels. A set screw 33 is provided for each tacking disc, to serve as a stop for limiting movement of the arm 25 toward the bracket and hence to provide for radial adjustment of the tacker discs with respect to the drum 8. The brackets 12 and 13 are slid along the rod 15 by yokes 35 that are also slidable on the rod 15 and have threaded engagement with the screw 18.

At their lower ends, the brackets 12 and 13 have slidable engagement with a guide rod 36 whose ends are supported on hangers 37 loosely supported by the rod 15. The rod 36 extends through a link 38 whose lower end is pivotally connected to a pedal lever 39 so that when a foot pedal 40 is depressed, the brackets 12—13 and their associated stitchers and tacker wheels will be moved against the drum as shown in Fig. 2. Turning of the screw shaft 18 will then move the two sets of discs toward opposite ends of the drum 8, to tack and stitch the fabric plies into place, the operator meanwhile holding down the pedal 40 with a desired pressure. When the discs pass off the ends of the drum, they will depress the fabric plies 42 as shown in Fig. 7, to permit of conveniently placing the bead cores preliminary to wrapping the edges of the fabric around the same. A stop screw 43 on the base of the machine is adjustable to limit pedal movement and hence the extent to which the fabric will be bent inward at the ends of the drum.

Upon completion of this operation, removal of the operator's foot will permit a spring 44 to raise the pedal and swing the stitcher and tacker discs away from the drum, thereupon the hand wheel 19 will be rotated to return the discs to their starting positions, near the middle of the drum.

The tacking discs 24 exert a yieldable pressure on the plies by reason of their springs 30, the springs nearer the ends of the drum being usually set under less tension than those springs nearest to the stitchers 10 and 11. The tackers exert lighter pressures on the fabric than do the stitchers and effect a preliminary adhesion of the fabric plies to one another at gradually increasing pressures as they move toward the ends of the drum. There is thus less danger of wrinkling of the fabric plies under the heavy stitching pressures than where tacker discs are not employed. A fewer or greater number of tacker discs may be used, depending upon the size of the drum.

The tacker discs serve the further purpose of assisting in uniting fabric plies that extend beyond the ends of the drum, since they will be moved somewhat by their springs closer to the axis of the drum than are the stitchers 11—12 (see Fig. 7) and the centrifugal force of the fabric plies during rotation of the drum will hold them somewhat snugly against the discs, to effect slight adhesion of the fabric layers at their edges, and thereby facilitate placing of the bead core when the stitchers have completed their work. After placing of the bead cores the fabric will be wrapped around them in any suitable manner, as shown for example in my Patent 2,320,190.

Tendency of the fabric plies to wrinkle during stitching, may further be overcome by tilting the stitchers and tacking discs angularly as shown in Fig. 6 and thus producing a wiping action on the fabric from the mid point toward the ends of the drum.

I claim as my invention:

1. Tire building apparatus comprising a rotatable drum for receiving fabric plies, a pair of stitching discs positioned to press the plies on the drum, means for simultaneously shifting the discs in opposite directions, from mid points on the drum face, toward the ends thereof, a pivotally mounted tacking element associated with each stitching disc in position to move in advance thereof, and arranged to effect incomplete adhesion of the plies to one another, and a spring for yieldably transmitting working pressure to the tacking element.

2. Tire building apparatus comprising a rotatable drum for receiving fabric plies, a stitching disc, a plurality of tacking discs associated in unitary relationship with the stitching disc, means for shifting the stitching disc and its associated tacking discs axially of the drum while in engagement with the fabric plies, with the tacking discs in advance of the stitching disc, the tacking discs being rotatable and having axes angularly adjustable relative to the axis of the drum, and springs for yieldably transmitting working pressures to the tacking discs.

3. Tire building apparatus comprising a rotatable drum for receiving fabric plies, a stitching disc, a plurality of tacking discs associated in unitary relationship with the stitching disc, means for shifting the stitching disc and its associated tacking discs axially of the drum while in engagement with the fabric plies, with the tacking discs in advance of the stitching disc, such distance that the discs will be carried beyond the ends of the drum, and springs for moving the tacking discs toward the axis of the drum independently of the stitching disc after they have passed beyond the end thereof.

4. Tire building apparatus comprising a rotatable drum for receiving fabric plies, a stitching disc, a plurality of tacking discs associated in unitary relationship with the stitching disc, means for shifting the stitching disc and its associated tacking discs axially of the drum while in engagement with the fabric plies, such distance that the discs will be carried beyond the ends of the drum, and means for moving the discs a slight distance toward the axis of the drum after they have passed beyond the end thereof, the tacking discs being moved further toward said axis than the stitching disc.

5. Tire building apparatus comprising a rotatable drum for receiving fabric plies, a pivotally-mounted bracket, means for rocking the bracket on an axis parallel to the axis of the drum, means for moving the bracket parallel to said axis, from a mid point on the drum face toward one end thereof, a stitching disc rotatably mounted on a fixed axis on the bracket, in position to bear against fabric plies on the drum, arms pivotally connected to said bracket, at their inner ends, tacking discs rotatably mounted on the outer ends of the said arms, in position to engage fabric on the drum, at points between the stitching disc and said end of the drum, and springs for yieldably holding the said arms against pivotal movements backwardly relative to the bracket when the bracket is rocked in a direction to move the discs against fabric on the drum.

6. Tire building apparatus comprising a rotatable drum for receiving fabric plies, a pivotally-mounted bracket, means for rocking the bracket on an axis parallel to the axis of the drum, means for moving the bracket parallel to said axis, from a mid point on the drum face toward one end thereof, a stitching disc rotatably mounted on a fixed axis on the bracket, in position to bear against fabric plies on the drum, arms pivotally connected to said bracket, at their inner ends, tacking discs rotatably mounted on the outer ends of the said arms, in position to engage fabric on the drum at points between the stitching disc and said end of the drum, and springs for yieldably holding the said arms against pivotal movements backwardly relative to the bracket when the bracket is rocked in a direction to move the discs against fabric on the drum, the springs being independently adjustable to vary their respective effective forces.

7. Tire building apparatus comprising a rotatable drum for receiving fabric plies, a pivotally-mounted bracket, means for rocking the bracket on an axis parallel to the axis of the drum, means for moving the bracket parallel to said axis, from a mid point on the drum face toward one end thereof, a stitching disc rotatably mounted on a fixed axis on the bracket, in position to bear against fabric plies on the drum, arms pivotally connected to said bracket, at their inner ends, tacking discs rotatably mounted on the outer ends of the said arms, in position to engage fabric on the drum, at points between the stitching disc and said end of the drum, springs for yieldably holding the said arms against pivotal movements backwardly relative to the bracket when the bracket is rocked in a direction to move the discs against fabric on the drum, and means for changing the angularity of the tacking discs relative to their axes, independently of the stitching disc.

EDWIN MILLER.